Patented June 12, 1951

2,556,963

UNITED STATES PATENT OFFICE 2,556,963

BENZENES CONTAINING SULFUR IN THEIR ALLYLIC OR PROPENYLIC SIDE CHAINS AND PROCESS OF PREPARING THEM

Olivier Gaudin, Neuilly-sur-Seine, France

No Drawing. Application July 23, 1947, Serial No. 763,167. In Great Britain July 15, 1946

Section 1, Public Law 690, August 8, 1946
Patent expires July 15, 1966

9 Claims. (Cl. 260—125)

This invention relates to a new class of benzenes containing sulfur in their allylic or propenylic side chains and to processes for preparing such benzenes. Certain of these novel compounds are particularly useful for therapeutic purposes.

The class of compositions of matter of my present invention consists of organic substances resulting from the action of sulfur on one or more organic substances of the general formula R—R', in which R represents phenyl and R' represents a side chain comprising at least 3 carbon atoms such as an allyl or a propenyl radical.

The invention comprises also processes of manufacturing such new compositions of matter.

It is well known that rather unstable additive compounds of sulfur are obtained by the action of sulfur on unsaturated organic compounds, such as for instance terpenes. However, the oily or tar-like substances thus obtained are not well defined chemical compounds; they are polymers with a very variable sulfur content from which no crystallized product has ever been obtained.

The invention is distinguished from the prior art particularly in that it comprises new compositions of matter of the general character set forth above, from which it is possible to derive pure and stable chemical compounds, some of which have been found to be of considerable therapeutic value. Such new compositions of matter can be obtained chemically pure in their crystallized form. Their molecule contains 3 atoms of sulfur.

One of the new compositions of matter of the present invention which will be described more in detail below, results from the action of sulfur on anethol or on its isomer estragole. A crystallized substance has been isolated from this composition: Trithioparamethoxyphenylpropene. I have described this new composition of matter in "Comptes Rendus" of the Academy of Sciences of Paris, vol. 224, pages 479–481 and pages 577–578. The physiological and therapeutic properties of this new composition of matter were described by me in "Comptes Rendus" of the Academy of Medicine of Paris, vol. 131, pages 265–269.

Trithioparamethoxyphenylpropene has an extremely small toxicity. It requires a dose of 6 grams per kilogram of animal to cause the death of a guinea pig in 36 hours. That is over 9,000 times the normal human theapeutic dose. It may, therefore, be considered practically non-toxic.

The most important physiological properties of the new composition of matter reside in its very considerable choleretic action and in a diuretic action provoking the elimination of excess urea.

As a human therapeutic, this new composition of matter may, for instance, be administered in an average dose of 0.0125 gram for a total dosage of 0.0375 to 0.075 gram in a period of 24 hours. It may be taken in the form of pellets or pills or in any other form that can be administered through the mouth.

I have investigated 150 clinical cases and treated them with trithioparamethoxyphenylpropene, and I have obtained very satisfactory results, particularly in the case of hepatic disorder, gall bladder disorders, and allergies or dermatoses of hepatic origin.

My investigations have led to the following broad conclusions:

1. Trithioparamethoxyphenylpropene has a constant choleretic action;

2. In the case of every syndrome wherein there exists a functional trouble of the biliary secretion, the clinical improvement resulting from doses of 0.0375 to 0.075 gram per 24 hours is marked.

3. The most constant results are obtained in cholecystitis with or without associated manifestations.

In the manufacture of the new class of compositions of matter of the present invention, use may be made of elementary sulfur in any one of its varieties as well as of substances easily liberating sulfur, such as polysulfides or halogen sulfides, for instance.

As organic substances, use may be made of various compounds of vegetal origin such as estragole, eugenol, safrole, amongst the allyl compounds; anethol, iso-eugenole, iso-safrole, amongst the propenyl compounds.

It is also possible to employ natural oils containing any of the above-mentioned substances such as anise oil for anethol; alternatively, it is also practicable to use synthetic products of the general type set forth above, for instance allyl phenols prepared according to the well known Claisen process.

The process according to the present invention may be carried out in the presence of suitable catalysts, such as vulcanization catalysts. It is also possible to operate in the presence of solvents.

The reaction is achieved by heating the reacting substances in an open receptacle up to temperature varying according to the reacting substances chosen; for instance in the case of sulfur and anethol, the reacting temperature is about 200° C.

The reaction contemplated by the present invention may be represented as follows in the case of a propenyl benzene and of sulfur:

$$R-CH=CH-CH_3 + 5S \rightarrow R-C_3HS_3 + 2SH_2$$

or, in the case of an allyl benzene and of sulfur:

$$R-CH_2-CH=CH_2 + 5S \rightarrow R-C_3HS_3 + 2SH_2$$

*Example I*

There is heated in an open receptacle a mixture of:

| | Grams |
|---|---|
| Sulfur | 160 |
| Anethol | 148 |

The reaction starts at about 148° C. and the temperature is raised above 200° C. A considerable liberation of hydrogen sulfide is observed. During the reaction, the mass becomes progressively thicker and thicker. After cooling, the mass is first treated with a solvent, such as boiling acetone, then filtered, and is allowed to crystallize.

After several fractionized crystallizations during which other solvents may be added, there is finally obtained a crystallized substance in red-brown needles having no smell but a bitter taste and melting at 108°–109° C. This substance is insoluble in water and slightly soluble in most of the organic solvents. Further, this new composition of matter is perfectly stable and does not oxidize in the air.

The reaction may be represented by the following formula:

$$CH_3O-C_6H_4-CH=CH-CH_3 + 5S \rightarrow$$
$$CH_3O-C_6H_4-C_3HS_3 + 2H_2S$$

*Example II*

In the process of Example I, anethol is replaced by estragole. The resulting substance has in every respect the same aspect as the substance resulting from the process described in the preceding example. It melts also at 108°–109° C. either in pure state or mixed with the substance resulting from the anethol treatment.

The reaction may be represented by the following formula:

$$CH_3O-C_6H_4-CH_2-CH=CH_2 + 5S \rightarrow$$
$$CH_3O-C_6H_4-C_3HS_3 + 2H_2S$$

In the foregoing processes, there is employed a quantity of sulfur corresponding to 5 atoms of sulfur per mol of organic substance.

There is no use in substantially increasing the proportions of sulfur since the surplus amount of sulfur does not react in the process in view of secondary reactions, and the surplus quantity of sulfur thus introduced would be found unaltered at the end of the reaction.

The amount of sulfur may thus be limited since it does not totally react but it is not desirable to reduce the quantity of sulfur below a certain proportion, since this would tend to reduce the yield of the reaction.

It is not desirable to work the reaction below 200° C. in the open air, since too low a temperature would slow down the reaction, thus increasing the duration of the heating period. The heat should not be applied too briskly since the gases produced might lead to an explosion. Further, too brisk a heating process lowers the efficiency of the reaction through the production of tar-like substances.

The organic compounds including three atoms of sulfur and obtained by the above-described process can give, under certain circumstances, additive compounds with the following elements:

Halogens . . . Cl, Br, I

Metallic Halides . . . $SnCl_4$, $HgCl_2$, $CuCl_2$

The halogenating process according to the present invention is disclosed and claimed in my co-pending divisional application Serial No. 224,672, filed May 4, 1951.

What is claimed is:

1. As a new composition of matter, trithioparamethoxyphenylpropene having the formula $$CH_3O-C_6H_4-C_3HS_3$$

2. A process for preparing a new composition of matter, comprising heating, in the presence of air and at a temperature between 150° and 250° C., elementary sulfur and compounds selected from the group of allyl and propenyl phenols and their other derivatives, said sulfur and organic matter being reacted at the ratio of 5 sulfur atoms to 1 organic molecule.

3. A process for preparing a new composition of matter, comprising heating, in the presence of air and at a temperature between 150° and 250° C., elementary sulfur and compounds selected from the group consisting of estragole and its propenyl isomer, said sulfur and organic compound being reacted at the ratio of 5 sulfur atoms to 1 molecule of organic matter.

4. A process for preparing a new composition of matter, comprising heating, in the presence of air, and at a temperature between 150° and 250° C., elementary sulfur and compounds selected from the group consisting of eugenol and its propenyl isomer, said sulfur and organic compound being reacted at the ratio of 5 sulfur atoms to 1 molecule of organic matter.

5. A process for preparing a new composition of matter, comprising heating, in the presence of air and at a temperature between 150° and 250° C., elementary sulfur and compounds selected from the group consisting of safrole and its propenyl isomer, said sulfur and organic compound being reacted at the ratio of 5 sulfur atoms to 1 molecule of organic matter.

6. The process of claim 2 wherein the reaction is carried out in an organic solvent.

7. The process of claim 2 wherein the reaction is carried out in the presence of a catalyst.

8. A process for preparing trithioparamethoxyphenylpropene comprising the steps of heating together in the presence of air and at a temperature between 150° and 250° C. elementary sulfur and anethol in the ratio of five sulfur atoms to one anethol molecule, and controlling the heating conditions so that hydrogen sulfide is liberated during the reaction according to the following general formula:

$$CH_3O-C_6H_4-CH=CH-CH_3 + 5S \rightarrow$$
$$CH_3O-C_6H_4-C_3HS_3 + 2H_2S$$

9. A process for preparing trithioparamethoxyphenylpropene comprising the steps of heating together in the presence of air and at a temperature between 150° and 250° C. elementary sulfur and estragole in the ratio of five sulfur atoms to one estragole molecule, and controlling the heating conditions so that hydrogen sulfide is liberated during the reaction according to the following general formula:

$$CH_3O-C_6H_4-CH_2-CH=CH_2 + 5S \rightarrow$$
$$CH_3O-C_6H_4-C_3HS_3 + 2H_2S$$

OLIVIER GAUDIN.

(References on following page)

REFERENCES CITED

The following references are of record in the file of this patent:

UNITED STATES PATENTS

| Number | Name | Date |
|---|---|---|
| 2,387,286 | Otto | Oct. 23, 1945 |

OTHER REFERENCES

Shemyakin et al., J. Gen. Chem. (USSR), 13, 175–83 (1943); 38 CA 1490.

Monti, Gazz. Chim. ital., 74, 23–5 (1944); 40 CA 3105.

Serial No. 414,982, Bottcher, (A. P. C.), pub- Apr. 20, 1943.